US012612062B2

(12) United States Patent
Valavanur Umasankar et al.

(10) Patent No.: US 12,612,062 B2
(45) Date of Patent: Apr. 28, 2026

(54) VEHICLE DRIVER ASSISTANCE SYSTEM USING VEHICLE LEVEL DATA, ENVIRONMENTAL DATA, AND USER RELATED DATA

(71) Applicant: TVS MOTOR COMPANY LIMITED, Chennai (IN)

(72) Inventors: Kalpana Valavanur Umasankar, Chennai (IN); Mazumdar Dipanjan, Chennai (IN); Dhinagar Samraj Jabez, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 255 days.

(21) Appl. No.: 17/791,064

(22) PCT Filed: Dec. 12, 2020

(86) PCT No.: PCT/IN2020/051025
§ 371 (c)(1),
(2) Date: Jul. 6, 2022

(87) PCT Pub. No.: WO2021/149072
PCT Pub. Date: Jul. 29, 2021

(65) Prior Publication Data
US 2023/0018340 A1 Jan. 19, 2023

(30) Foreign Application Priority Data
Jan. 25, 2020 (IN) .............................. 202041003447

(51) Int. Cl.
*B60W 50/14* (2020.01)
*B60L 58/13* (2019.01)
(Continued)

(52) U.S. Cl.
CPC ............. *B60W 50/14* (2013.01); *B60L 58/13* (2019.02); *B60L 58/16* (2019.02); *B60L 58/24* (2019.02);
(Continued)

(58) Field of Classification Search
None
See application file for complete search history.

(56) References Cited

U.S. PATENT DOCUMENTS 9,346,365 B1 5/2016 Penilla et al.
10,395,332 B1 8/2019 Konrardy et al.
(Continued)

OTHER PUBLICATIONS

International Search Report issued in corresponding International Application No. PCT/IN2020/051025 mailed Apr. 19, 2021 (4 pages).
(Continued)

*Primary Examiner* — Angela Y Ortiz
*Assistant Examiner* — Charles Pall
(74) *Attorney, Agent, or Firm* — Osha Bergman Watanabe & Burton LLP

(57) ABSTRACT

The present subject matter relates generally to a driver assistance system and method for a vehicle. The driver assistance system includes a vehicle having a plurality of sensors, a telematics unit to communicate vehicle level data to the surroundings of the vehicle, a display device to display the vehicle level data, a server, and a smart device. The smart device communicates with the server on a first network and with the display device on a second network. The vehicle, the server, and the smart device communicates through each other via communication network. The invention is based on smart device interface with different communication devices to provide the user with real time vehicle, environmental data, and user related data.

13 Claims, 13 Drawing Sheets

(51) Int. Cl.

| | |
|---|---|
| *B60L 58/16* | (2019.01) |
| *B60L 58/24* | (2019.01) |
| *G01C 21/34* | (2006.01) |
| *G01C 21/36* | (2006.01) |

(52) U.S. Cl.

CPC ..... *G01C 21/3469* (2013.01); *G01C 21/3617* (2013.01); *B60L 2240/545* (2013.01); *B60L 2240/62* (2013.01); *B60L 2240/70* (2013.01); *B60L 2250/16* (2013.01); *B60L 2260/52* (2013.01); *B60W 2050/146* (2013.01); *B60W 2556/10* (2020.02)

(56) References Cited

U.S. PATENT DOCUMENTS

| | | | |
|---|---|---|---|
| 2003/0069683 A1* | 4/2003 | Lapidot ............ | G08G 1/096725 701/423 |
| 2008/0319665 A1 | 12/2008 | Berkobin et al. | |
| 2012/0133530 A1* | 5/2012 | Morgan ................ | H04W 4/021 340/989 |
| 2016/0171521 A1 | 6/2016 | Ramirez et al. | |
| 2016/0375780 A1 | 12/2016 | Penilla et al. | |
| 2018/0143639 A1* | 5/2018 | Singhal ................... | G01S 15/02 |
| 2018/0238703 A1* | 8/2018 | Vulcano ................. | G01C 21/36 |
| 2020/0149912 A1* | 5/2020 | Sheha .................... | G01C 21/30 |
| 2021/0055122 A1* | 2/2021 | Pham .................... | G08G 1/0145 |

OTHER PUBLICATIONS

Written Opinion issued in corresponding International Application No. PCT/IN2020/051025 mailed Apr. 19, 2021 (6 pages).

* cited by examiner

300

VEHICLE DRIVER ASSISTANCE SYSTEM USING VEHICLE LEVEL DATA, ENVIRONMENTAL DATA, AND USER RELATED DATA

TECHNICAL FIELD

The present subject matter relates generally to a vehicle. More particularly but not exclusively the present subject matter relates to a driver assistance system of the vehicle.

BACKGROUND

In electric or hybrid vehicles, batteries are the source of power which drives the motor in order to run the vehicle. Since the birth of electric vehicles, battery technology has restricted the practical process of electric vehicles to protect the battery, improve battery life, and reduce the cost of batteries which has been the core of electric vehicle battery technology research and development. So, there is a phenomenal requirement to provide better service system to the user of such vehicles.

The only power source to drive the pure electric vehicle is battery. Other electrical components like headlamp, turn indicators, display device, etc. also derives power from the battery to be in operation from time to time. The display device displays important parameters of the vehicle; for example—mode of vehicle operation, average speed, charge left in the battery, charging state of the vehicle, etc. throughout the operation of said electric vehicle which requires charge from the battery. Compared to four wheeled electric vehicles, two wheeled electric vehicles have very less space to accommodate more sets of battery or a bigger battery for the operation of electric vehicles. So, the existing battery is responsible to provide power to the drive system and to all the electrical components of the vehicle.

BRIEF DESCRIPTION OF THE DRAWINGS

The details are described with reference to an embodiment implemented in a vehicle along with the accompanying figures. The same numbers are used throughout the drawings to reference similar features and components.

DETAILED DESCRIPTION

Figure 1:
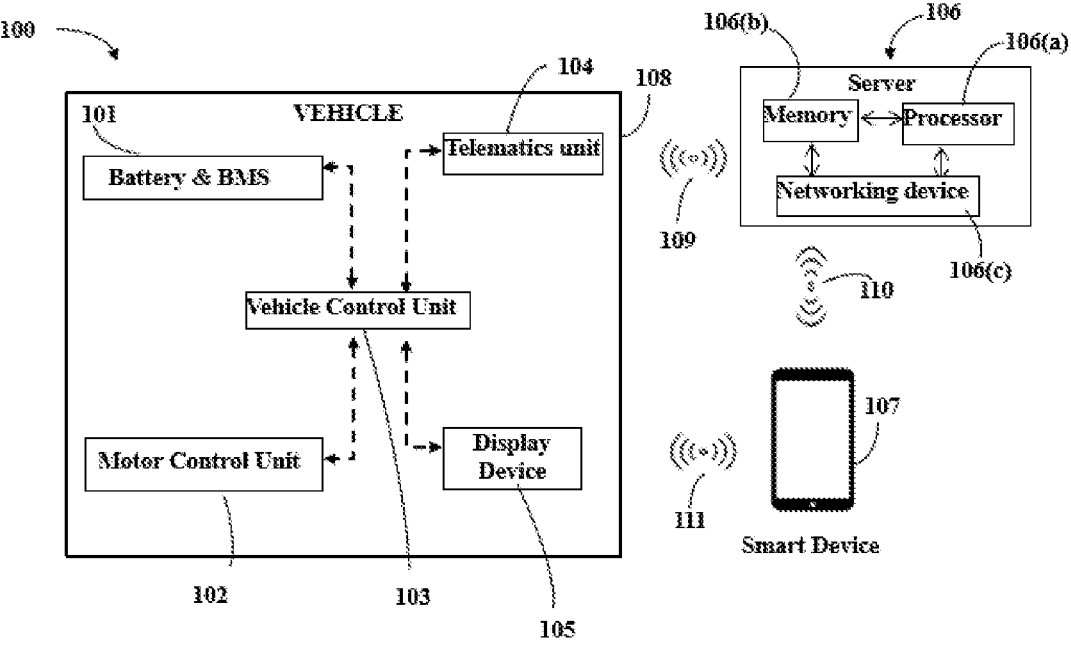
FIG. 1 exemplarily illustrates a block diagram of a driver assistance system.

The rider of the vehicle and/or manufacturer has to keep a periodic check on the battery state of charge (SOC), battery state of health (SOH), cell temperature, etc. to avoid any fault in the electric vehicle during trip. The person driving the vehicle may worry that the battery will run out of the power before a charging station/point is reached or even before the destination is reached & potentially get stranded. In order to avoid above mentioned situation, the user of the vehicle will have to plan the whole trip in advance. The user will have to take note of the distance to be travelled, road conditions, and other such parameters.

The dynamic nature of different parameters on which the trip was planned by the user is the major challenge for the user of electric vehicle as the user may not be able to rectify changes or any alteration in route in real time. Also, it is difficult to know the charging status of the vehicle if the user is not near the vehicle. Further, to drive such a vehicle safely in traffic conditions or park the vehicle in narrow parking lots requires the user of the vehicle to be highly attentive. Thus, there is a need for a system which keeps informed to the user about the State of battery charge, health of battery, and also assists the user in planning the trip, navigation of the vehicle and parking of the vehicle based on vehicle level data and environmental or traffic conditions in real time. In solutions known in art, the assistance systems are complex & expensive in nature making it economically unviable to be implemented in a saddle type two or three wheeled vehicle. Also design in known art are not easy to assemble, service as well as maintain. So, there is a need to cater to the various requirements of user while overcoming all above problems as well as other problems of known art.

The present invention is an improved driver assistance system for a vehicle. The vehicle may be an electric vehicle or a hybrid vehicle. This invention is particularly based on smart device interface with different communication devices to provide the user with real time vehicle, environmental data, and the user related data. This real time data is analysed to provide better vehicle riding experience to the user in any ongoing or upcoming trip. The driver assistance system provides inputs to the rider for different parameters like real time charging status of the vehicle, monitors health of the battery of the vehicle, and provides driving suggestions for better vehicle operation range. The driver assistance system predicts and indicates to the rider about the distance to empty of the vehicle based on the vehicle level data, historical driving pattern of the user, and environmental conditions. The driver assistance system makes the trip hassle free for the user of the vehicle. An overall analysis of the trip is dynamically displayed on a display device of the driver assistance system to assist the user for navigation and parking of the vehicle. The smart device in possession of the user facilitates remote monitoring of the health of the vehicle.

As per an aspect of the present subject matter, the driver assistance system for assisting the user includes a vehicle having a plurality of sensors to receive a vehicle level data, a server, and a smart device. The vehicle, the server, and the smart device communicate with each other via one or more communication networks.

As per an aspect of the present subject matter, the vehicle comprises of a telematics unit to communicate the vehicle level data to the surroundings of said vehicle, and a display device to display the vehicle level data from said sensors for assistance of user.

As per an aspect of the present subject matter, the display device being configured with a Thin Film Transistor cluster.

As per an aspect of the present subject matter, the server communicates with said telematics unit over a first network.

The smart device communicates with the server on a second network. The smart device communicates with the display device on a third network.

As per an aspect of the present subject matter, the vehicle comprises of a battery management system, a vehicle control unit, and a motor control unit. The battery management system, the vehicle control unit, and the motor control unit being connected bi-directionally with each other to sense and communicate the vehicle level data to the telematics unit.

As per an aspect of the present subject matter, the server comprises of a processor, a memory, and a networking device. The processor being configured to receive an environment related data from the smart device and to receive the vehicle level data from the telematics unit. The processor being configured to process the environment related data and said vehicle related data. The memory configured to store data. The networking device configured to communicate with the telematics unit of said vehicle and the smart device connected to the vehicle.

As per an aspect of the present subject matter, a method of driver assists operation to assist the user of a vehicle is disclosed wherein said method being implemented by a driver assistance system. The method comprises the steps of determining and communicating using a control unit, a vehicle level data to a telematics unit. Transmitting using telematics unit, the vehicle level data to a server to process the vehicle level data. Acquiring and analyzing, environment related data from a smart device by said server about external environment of the vehicle. Communicating, the analyzed vehicle level data and environment related data to said smart device connected to the vehicle by the server. Transmitting said vehicle level data and environment related data via said smart device to a display device.

As per an aspect of the present subject matter, the vehicle level data comprises of one or more of state of charge, battery state of health, cell temperature.

As per an aspect of the present subject matter, the method comprises the steps of communicating the vehicle level data to the server by the telematics unit over a first network.

As per an aspect of the present subject matter, the method comprises the steps of acquiring the environment related data about external environment of the vehicle, said environment related data includes at least one of the destinations of the trip, trip distance, average speed, the driving mode of the vehicle, ride details, current status of the charge of battery, last parked location, geo fencing, live tracking of the vehicle.

As per an aspect of the present subject matter, the method comprises the steps of communicating said analyzed vehicle level data and environment related data to the smart device by the server over a second network, and receiving environment related data from the smart device by the server over said second network.

As per an aspect of the present subject matter, the method comprises the steps of transmitting said analyzed vehicle level data and environment related data to the display device by the smart device over a third network.

As per an aspect of the present subject matter, the method comprises the steps of logging in to a user interface on the smart device by a user. Authenticating the identity of the user of the vehicle by the server. Fetching a ride history of the user from the server by the user interface of the smart device. Querying a user database in the server, said user database includes at least one of the historical drive patterns of the user, drive mode used by the user, estimated range of the vehicles used by the user, charging pattern of the vehicle used by the user. Transmitting the analyzed information to the display device. The embodiments of the present invention will now be described in detail with reference to an embodiment in a vehicle along with the accompanying drawings. However, the present invention is not limited to the present embodiments. The present subject matter is further described with reference to accompanying figures. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a block diagram of the driver assistance system 100 for a user of the vehicle 108. The driver assistance system 100 comprises a vehicle 108, a server 106, and a smart device 107. The vehicle 108, the server 106 and the smart device 107 remain in communication with each other. As exemplarily illustrated, the vehicle 108 comprises a battery management system (hereinafter BMS) 101, at least a control unit 102 and 103, a telematics unit 104, and a display device 105. The telematics unit 104 of the vehicle 108 communicates with the server 106 over a first network and the display device 105 communicates with the smart device 107 over a third network. The architecture of the driver assistance system 100 is discrete in nature. Each unit is separately placed and is not an integrated unit. Each component, for example, 101, 102, 103, 104, 105, 106, and 107 of the driver assistance system 100 is discretely positioned and interplay of the components assists the user of the vehicle 108, in planning trip, navigation, and parking of the vehicle 108. This discrete architecture reduces the complexity of driver assist system which makes it easier to assemble it on vehicle and increases ease of serviceability. Also, the discrete architecture reduces the overall cost of the driver assistance system 100. In an embodiment, the server 106 comprises a processor (106(*a*)) to process the received data, a memory (106(*b*)) to store data, and a networking device (106(*c*)) to communicate with the telematics unit 104 of said vehicle 108 and the smart device 107 connected to the vehicle 108.

As per the architecture of the present invention, The BMS 101, the telematics unit 104, the motor control unit 102, and the display device 105 of the vehicle 108 are bi-directionally connected to the vehicle control unit 103 via a communication network in the vehicle 108 as depicted in FIG. 1. The parameters related to the battery (not shown), the motor (not shown), the motor control unit 102, the telematics unit 104, the display device 105 in the vehicle 108 are communicated to the vehicle control unit 103 via a communication network in the vehicle 108 using one or more sensors. The telematics unit 104 is configured with a microcontroller (not shown), an accelerometer (not shown), a Global Positioning System (GPS) module (not shown), a Global System for Mobile Communication (GSM) module (not shown), a wireless transceiver with a RF antenna (not shown) and a Controller Area Network (hereinafter CAN) transceiver (not shown) connected to the communication network of the vehicle 108.

The display device 105 (also referred as instrument cluster) is typically mounted in vicinity of the head pipe (not shown) of a frame of the vehicle 108. The display device 105 communicates with the control unit 103 and the smart device 107 to provide visual and audio alerts or notifications on a user interface of the display device 107 to grab the attention of user. The visual notifications comprise a visual image which includes alphanumeric, graphics, and warning indicators as exemplarily illustrated in FIGS. 5a-5l. In a best embodiment of the invention, the display device 105 is a thin film transistor (TFT), flat panel display or screen. The TFT display is made using large sheets of transistors, each one of which is controlled independently. The TFT screen is an "active-matrix" screen where each pixel of the display is illuminated individually. The TFT display is sharper and brighter than a common LCD display, refreshes more quickly than a regular LCD display, and shows motion more smoothly. The TFT display has a display quality higher than a regular LCD display. The display device 105 comprises a controller, a graphics engine, an image processing unit, a user interface, and a wireless transceiver coupled (not shown in figures) to the controller.

The display device 105 wirelessly communicates the vehicle level data to the user interface of the smart device 107 using communication means not limited to Bluetooth, Infrared, Near Field Communication (NFC), ultra-band, ZigBee, and Wi-Fi and the like. The smart device 107 is possessed by the user of the vehicle 108. The user interface is provided on the smart device 107 and provides a graphical user interface on a display unit of the smart device 107. The user interface of smart device 107 fetches data from other applications in the smart device 107 not limited to contacts, incoming calls, incoming messages, device locations, and GPS data.

The user of said vehicle 108 plans a trip using the user interface of smart device 107 and sets/checks different parameters suited to the trip according to his/her needs. Said parameters may include destination of the trip, trip distance, average speed, the driving mode of the vehicle 108, ride details, current status of the charge of battery, last parked location, geofencing, live tracking, etc. of the vehicle 108.

Said parameters are displayed on said display device 105 when the vehicle is switched on. According to the parameters fed by the user, the user interface of the smart device 107 displays estimated mileage, estimated navigation time, approximate traffic conditions, estimated time of arrival at the destination, an estimate of the amount of energy remaining in the vehicle 108, and possible route can be taken with all the mentioned estimated values.

The smart device 107 provides driving suggestions to the user for better range; monitor the health of the battery; perform periodic maintenance check, and predicts wear and tear of parts of the vehicle 108 based on the parameters made available to it from the server 106. Said Parameters displayed on the smart device 107 are also displayed on the vehicle 108 during vehicle traction so that the user of the vehicle 108 need not to use the smart device 107 while riding the vehicle 108 thereby increases safety.

The smart device 107, the display device 105 through telematics device 104 are connected to the server 106 such that live information is shared across all the platforms. The server 106 has both trans-reception communications of the data collected from the vehicle 108 via the telematics unit 104 and processes the vehicle level data. The server 106 further collects environmental data and user related data from the user interface on the smart device 107, processes the environmental data and user related data along with the vehicle level data, and communicates the analyzed data to the user through the user interface of the smart device 107 over a second network and the user interface of the display device 105 over a third network.

Figure 3:
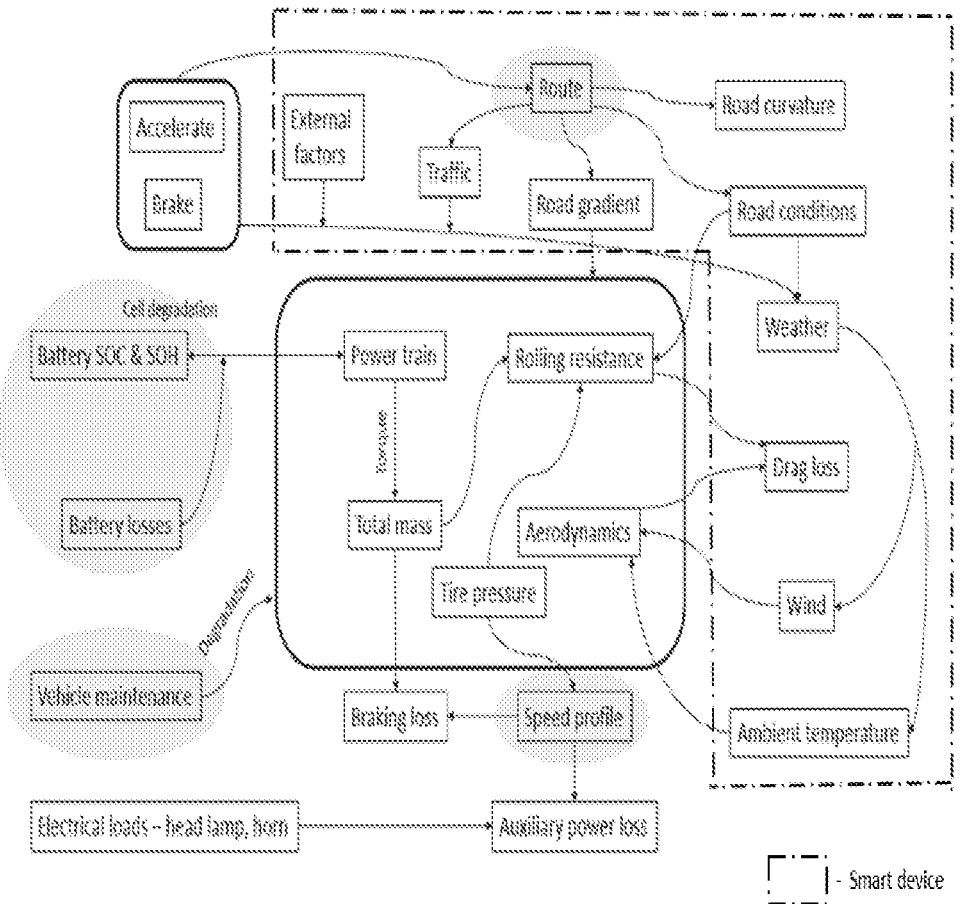
FIG. 3 exemplarily illustrates a data flow diagram showing vehicle and environmental data associated with the vehicle.

The vehicle level data comprises at least one of the location of the vehicle, battery state of charge (SOC), battery state of health (SOH), cell temperature of the battery, speed profile of the vehicle, auxiliary power loss of the vehicle, braking loss of the vehicle, tire pressure of the vehicle, health of power train of the vehicle, mass of the vehicle, aerodynamics of the vehicle, rolling resistance of the vehicle, acceleration and deceleration of the vehicle as exemplarily illustrated in FIG. 3. Using the vehicle level data, the server 106 computes at least one among time or distance remaining for a periodic maintenance check of the vehicle, average speed of the vehicle, drive mode of the vehicle, total distance travelled by the vehicle, mileage of the vehicle, estimated time for full charging of the battery, etc. The server 106 communicates such computed data to the user interface of the smart device 107 and subsequently to the display device 105. The server 106 can be a cloud network.

Further, the display device 105 accesses at least among the speed of the vehicle, the charge status of the battery, charging status of the battery, the status of interlocks for enabling features on the display device 105, status of regenerative braking in the vehicle, etc., from the vehicle control unit 103 of the vehicle 108. The controller of the display device 105 displays at least among the vehicle speed, the average speed, the drive mode, the mileage of the vehicle, the status of battery of the vehicle, the status of regenerative braking, an indication of park assist mode in forward or reverse direction on the user interface of the display device 105. Based on the status of the interlocks for enabling the features on the display device 105, the user is allowed to select, between power mode or economy mode to move the vehicle 108 and to select between forward or reverse navigation of the vehicle 108 with a predetermined speed in park assist mode.

The display device 105 renders a dynamic charging screen indicating the current level of charge in the battery and the estimated time for full charging of the battery on the user interface of the display device 105, based on the charging status of the vehicle 108. The display device 105 also determines and displays the status of the wireless transceiver, such as, a Bluetooth transceiver of the display device 105 on the user interface of the display device 105. The Bluetooth transceiver of the display device 105 connects to the Bluetooth transceiver of the smart device 107.

The environmental data comprises external factors, such as, lane diversions, real time traffic, road gradient, road conditions, road curvature, weather, ambient temperature, drag loss, and wind. The server 106 receives the environmental data, and the user related data from the user interface of the smart device 107. Further, the server 106 receives the user profile associated with the user interface of the smart device 107. A user related data includes the contacts on the smart device 107, the battery level of the smart device 107, the health of the battery, the signal strength of the smart device 107, the status of the wireless transceiver for example, the Bluetooth transceiver on the smart device 107, version of the user interface, the messaging application on the smart device 107, the calling application of the smart device 107, etc. is received by the server at the time the user connects the smart device 107 with the vehicle 108. The server 106 receives the desired destination from the user interface entered by the user and based on the environmental conditions and the vehicle level data, helps in planning a route to the destination from the current location with estimated time of arrival at the destination using the remaining charge of the battery of the vehicle 108. The planned route is output to the smart device 107 and subsequently to the display device 105. On the display device 105, a dynamic navigation route is displayed. In an embodiment, a turn-by-turn navigation of the vehicle towards the destination is displayed on the display device 105. Each turn is preceded by the distance to manoeuvre. This also intimate the next traffic signal waiting time, nearby trending zones, incidents and accidents etc.

The display device 105 will also display the nearby fuel station or/and battery charging station if the fuel/battery level is low. This will help the user to reach the destination without any delay or getting stranded. In an embodiment, an audible alert is also presented to the user. The server 106 also warns the user through the display device 105 of the vehicle 108 about charge status of the battery of the vehicle and immobilising the vehicle, if the destination cannot be reached with the remaining amount of charge of the battery based on availability of charging points en-route the destination. The display device 105 displays at least one of the message notifications, call notifications, and real time clock on the user interface in communication with the smart device 107. In an embodiment, the user interface of the smart device 107 allows geo-fencing to prevent movement of the vehicle 108 outside the geo-fenced region defined based on the parameters entered by the user. The server 106 determines current location of the vehicle 108 and provides alerts in the smart device 107 which in possession with a remote user, in case the vehicle 108 is taken outside the limits of the geo-fence. In an embodiment, the server 106 sends a warning to be displayed on the display device 105 to warn the user of the vehicle 108 about the limits of the geo-fence and navigation outside the limits of the geo-fence. In an embodiment, the server 106 immobilises the vehicle 108 if the vehicle 108 is outside the limits of the geo-fence. In an embodiment, the server 106 live tracks the location of the vehicle 108, thereby makes the vehicle 108 theft proof.

In an embodiment, the display device 105 functions in a day mode or a night mode based on sensing the brightness of the surroundings of the vehicle 108. In the night mode, the controller of the display device 105 reduces the brightness of the graphical user interface to allow for clear visibility of the graphical user interface to the user of the vehicle 108, hence make it suitable for the user to easily use the vehicle 108 at any time of the day.

Figure 2:
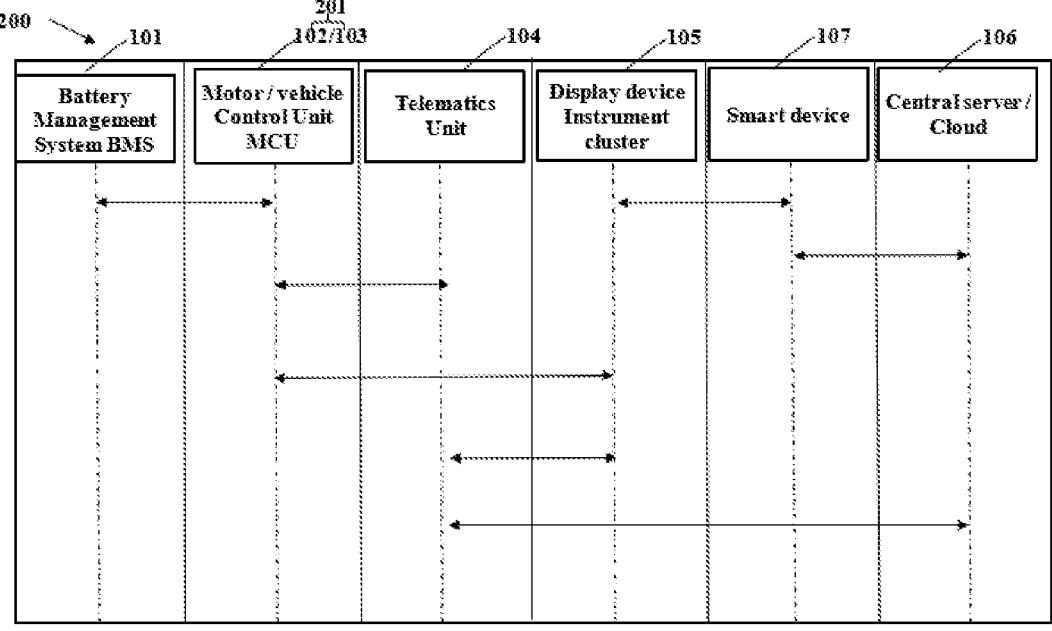
FIG. 2 exemplarily illustrates a data flow diagram showing exchange of data between the components of the driver assistance system.

FIG. 2 exemplarily illustrates a data flow diagram showing exchange of data between the components of the driver assistance system 100. The BMS 101 communicates the health of the battery to the vehicle control unit 103. The motor control unit 102 also communicates with the vehicle control unit 103. The telematics unit 104 is connected to the vehicle control unit 103. The vehicle control unit 103 has access to the vehicle level data. The display device 105 also communicates with the vehicle control unit 103. The user interface of the smart device 107 communicates with the display device 105 and the server 106. The telematics unit 104 further communicates vehicle level data to the server 106. The server 106 will collect the vehicle level data; process the vehicle level data from the telematics unit 104. The server 106 will receive other environmental data and the user related data from the user interface of the smart device 107. The server 106 will collect the data from vehicle 108 and smart device 107, process the data, analyze the data and the output of analysis will be communicated to the user through smart device 107. The smart device 107, in turn communicates to the display device 105. In an alternate embodiment, the analysis of data may be done by the smart device 107.

Figure 4:
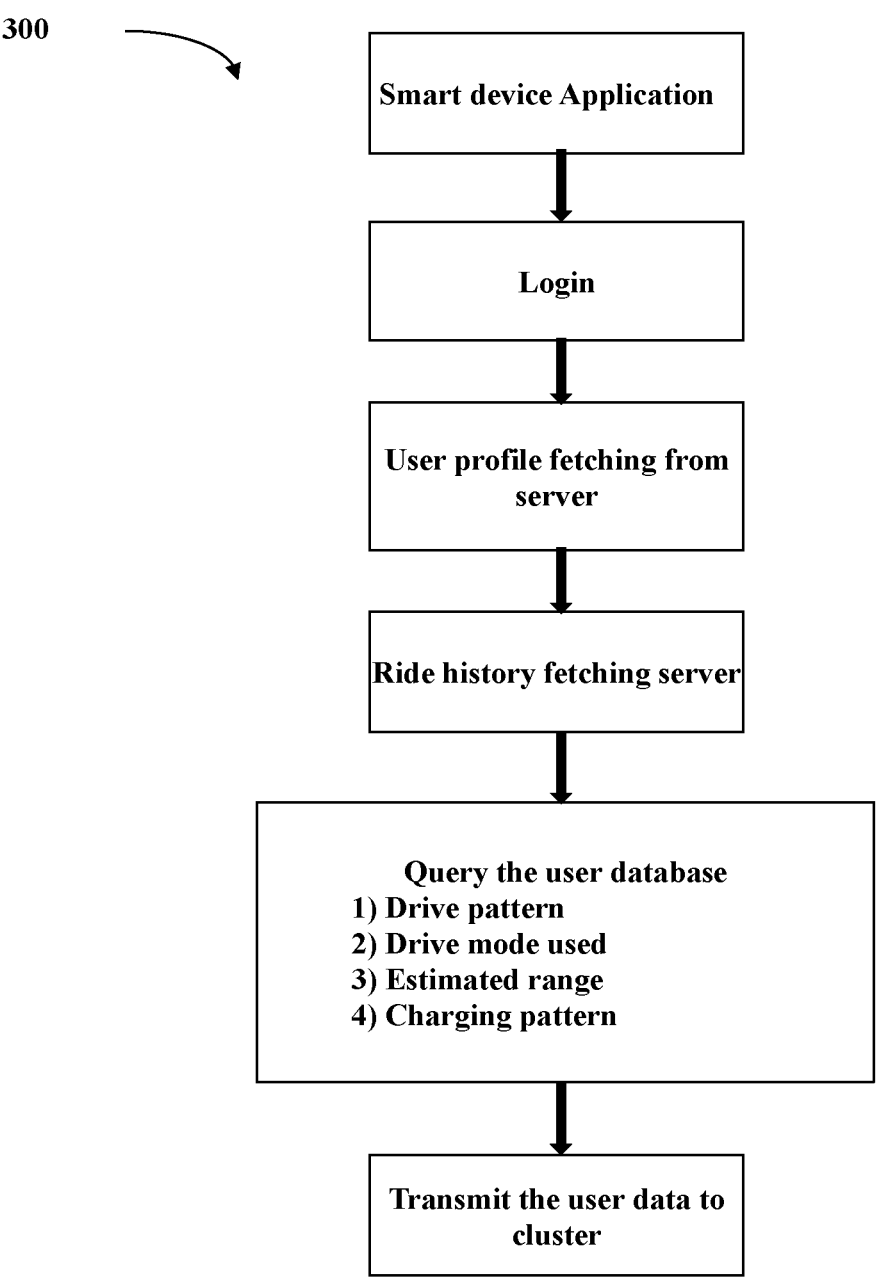
FIG. 4 exemplarily illustrates a flowchart comprising steps executed by the driver assistance system for the vehicle.

FIG. 4 exemplarily illustrates a flowchart 300 comprising steps executed by the driver assistance system 100 for the vehicle 108. The user of the vehicle 108 logs in to the user interface 107 on the smart device 107. The server 106 authenticates the identity of the user of the vehicle 108 and corresponding user profile is fetched from the server 106. The user interface of the smart device 107 fetches ride history of the user from the server 106. The ride history of the user also helps during shared mobility using the vehicle 108. In an embodiment, the user can log in to their user profile and can connect to any vehicle in fleet for shared mobility through the smart device 107.

In a vehicle in a fleet for shared mobility or a personal vehicle, a query is sent to a user database in the server 106 from the user interface of the smart device 107 to obtain at least one of the historical drive pattern of the user, drive mode used by the user, estimated range of the vehicles used by the user, charging pattern of the vehicle used by the user, etc. Further, the server 106 accesses the vehicle level data and the environmental data and user related data from the vehicle 108 and the smart device 107.

In an embodiment, the vehicle 108 is continuously connected to the server 106 and transmits the vehicle level data through the telematics unit 104 in a predetermined time. In an embodiment, the vehicle is intermittently connected to the server 106 and transmits the vehicle level data to the server 106 intermittently. The server 106 processes and analyses the vehicle level data and the environmental data and user related data based on current and historical driving pattern of the user. The server 106 communicates the analysed data to the user interface of the smart device 107 for the user of the vehicle, for a rider or a pillion rider of the vehicle. The smart device 107 in turn communicates the data to the display device 105 to display the data dynamically in the form of textual, graphical warning alerts/notifications, and/or audible notifications customizable by the user. In an embodiment, the user of the vehicle 108 remotely monitors the charge status of the vehicle 108, when the battery is not powered ON. The analysed data can also be used by the manufacturer for future upgrades of the vehicle 108 & improvements.

In an embodiment, the vehicle control unit 103 or the server 106 allows the user of the vehicle 108 to select and change between the power mode and the economy mode and vice-versa on the user interface of the display device 105 on-the fly, without reducing the speed of the vehicle 108 to a predetermined value. In an embodiment, the vehicle control unit 103 or the server 106 allows the user of the vehicle 108 to toggle in the park-assist mode between forward direction and reverse direction based on actuation of interlocks provided on the vehicle 108. The vehicle control unit 103 or the server 106 limits the speed of the vehicle 108 to a predetermine value in the park-assist mode to facilitate parking of the vehicle 108 by the user in narrow spaces with ease.

Figure 5A:
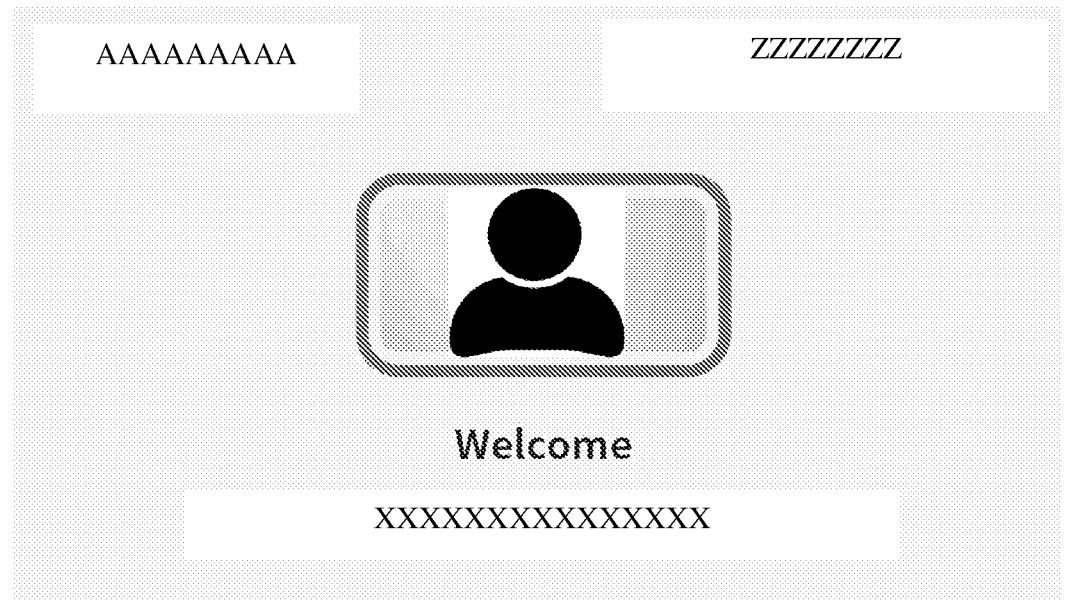
FIG. 5a exemplarily illustrates a display device connected to the vehicle showing User's login page.

FIG. 5*a* exemplarily illustrates a graphical user interface of the display device 105 of the vehicle 108 showing an authorization page for the user. On authentication of the login details of the user by the server 106, the smart device 107 is connected to the vehicle 108. The smart device 107 will load the details of the user, such as, historical driving pattern to the device from the server 106 and other user related details.

Figure 5B:
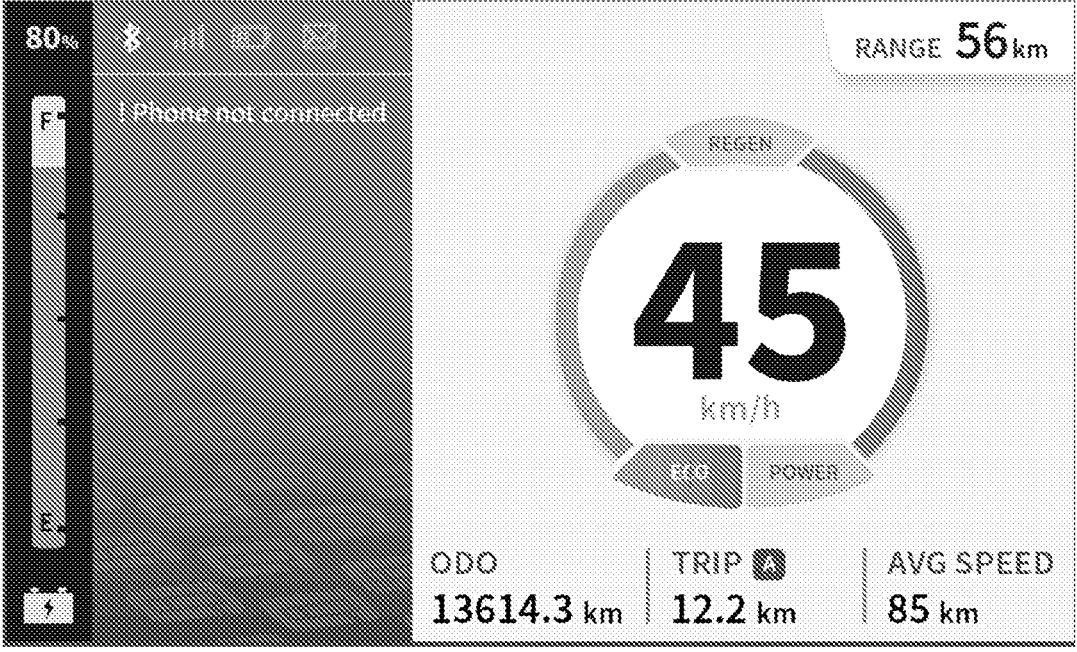
FIG. 5b exemplarily illustrates a graphical user interface of the display device, when not connected to the smart device.
Figure 5C:
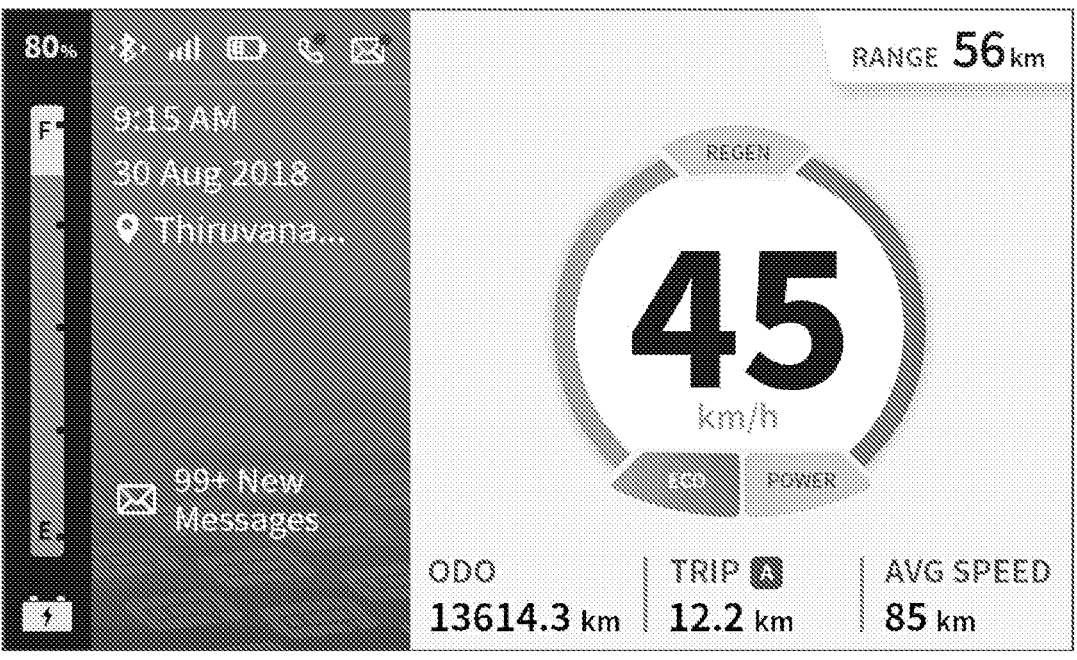
FIGS. 5c-5l exemplarily illustrate different graphical user interfaces of the display device when connected to the smart device.

FIG. 5*b* exemplarily illustrates a graphical user interface of the display device 105, when not connected to the smart device 107. The display device 105 shows the range that the vehicle 108 can cover depending on the remaining charge of the battery etc. The display device 105 further shows Trip distance A/B; Trip A shows the distance to be covered to reach the destination and Trip B shows the total distance to be covered from the current location to the destination and back to the current location. As exemplarily illustrated, the display device 105 shows the average speed of the vehicle 108 and the total distance the vehicle 108 has covered so far.

Figure 5D:
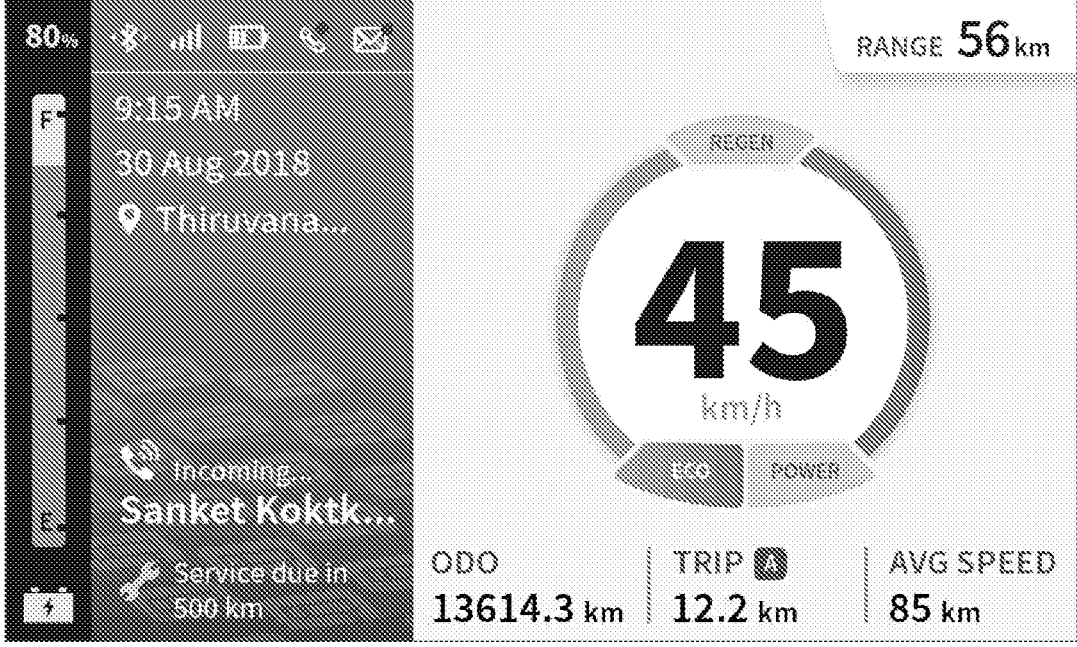

FIG. 5c-5l exemplarily illustrates different graphical user interfaces of the display device 105 when connected to the smart device 107. The display device 105 shows the status of charge in the battery. The display device 105 further displays of at least one of the date, day, year, real-time clock, and the current location of the vehicle 108. The display device 105 further shows message notifications of the messages received by the smart device 107. FIG. 5d exemplarily illustrates the graphical user interface of the display device 105 showing an incoming call and the name of the person calling from the calling application of the smart device 107. An incoming call, missed call notification and an unread message notification are also displayed on the graphical user interface of the display device 105.

Figure 5E:
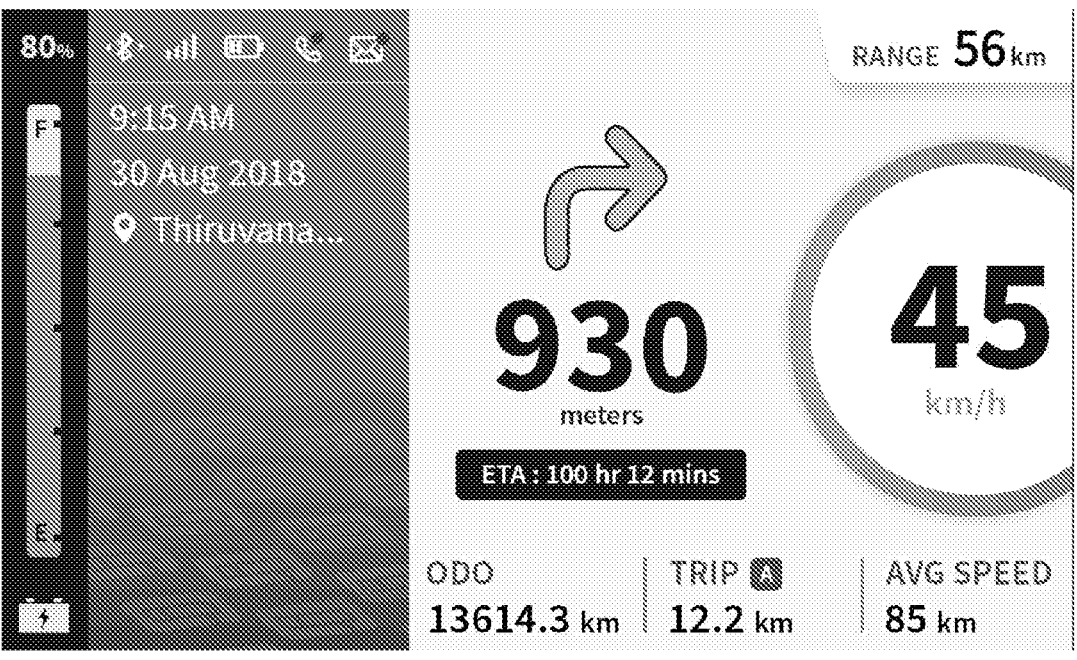
Figure 5F:
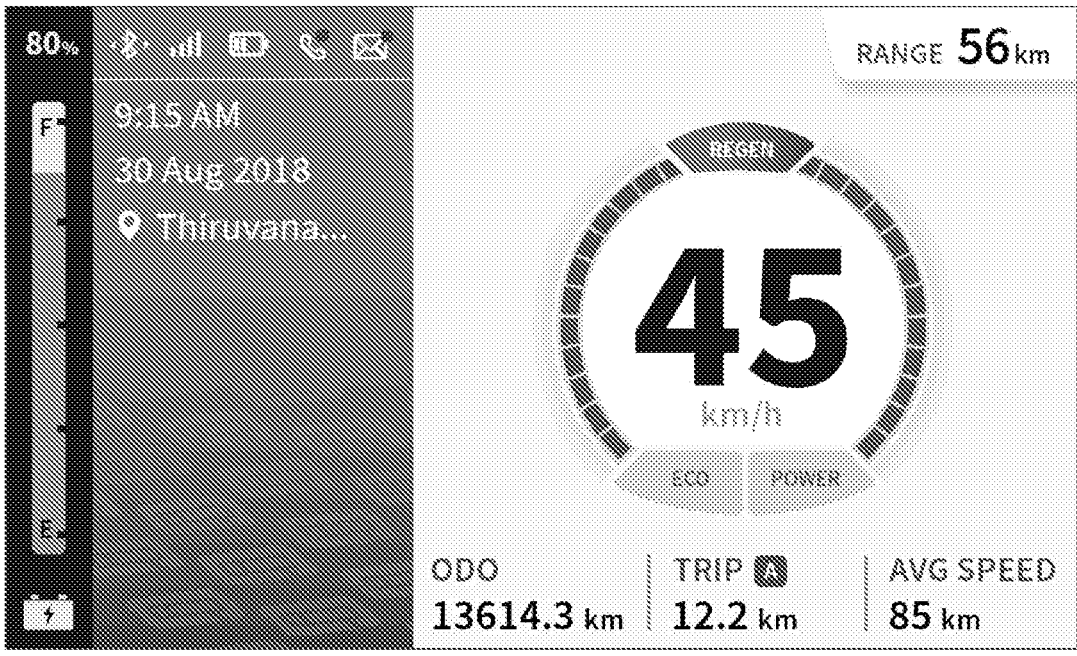
Figure 5G:
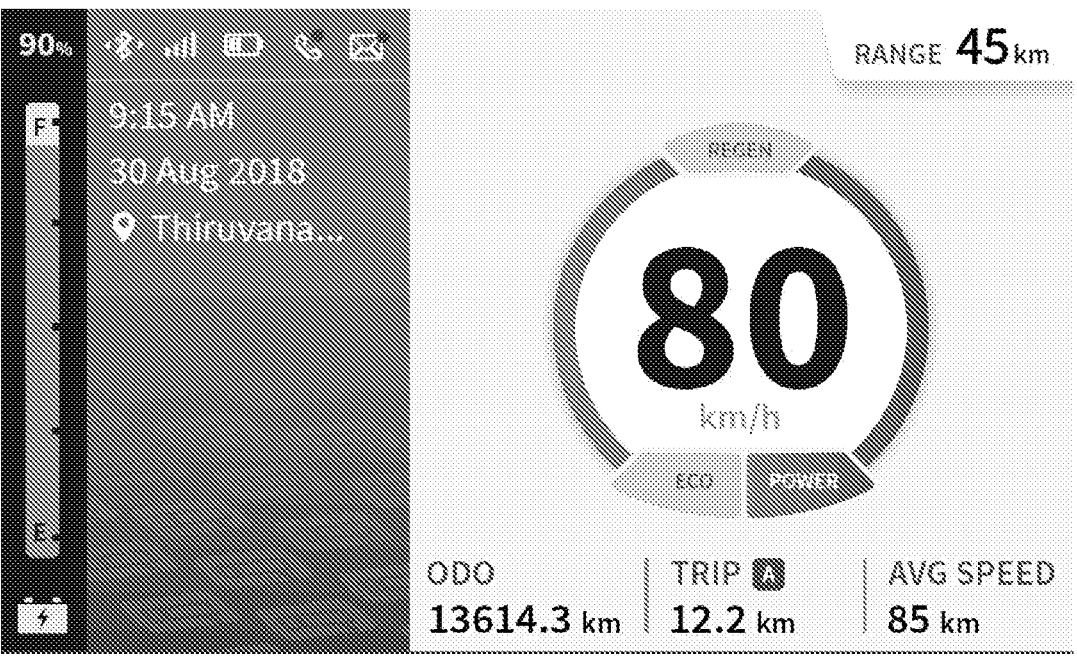
Figure 5H:
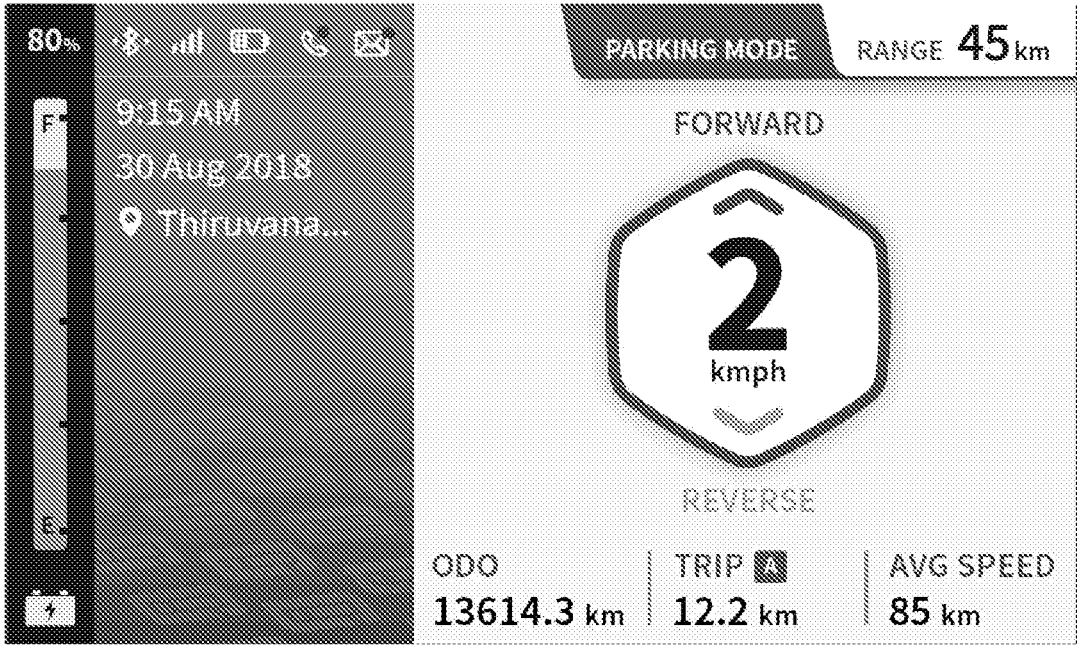
Figure 5I:
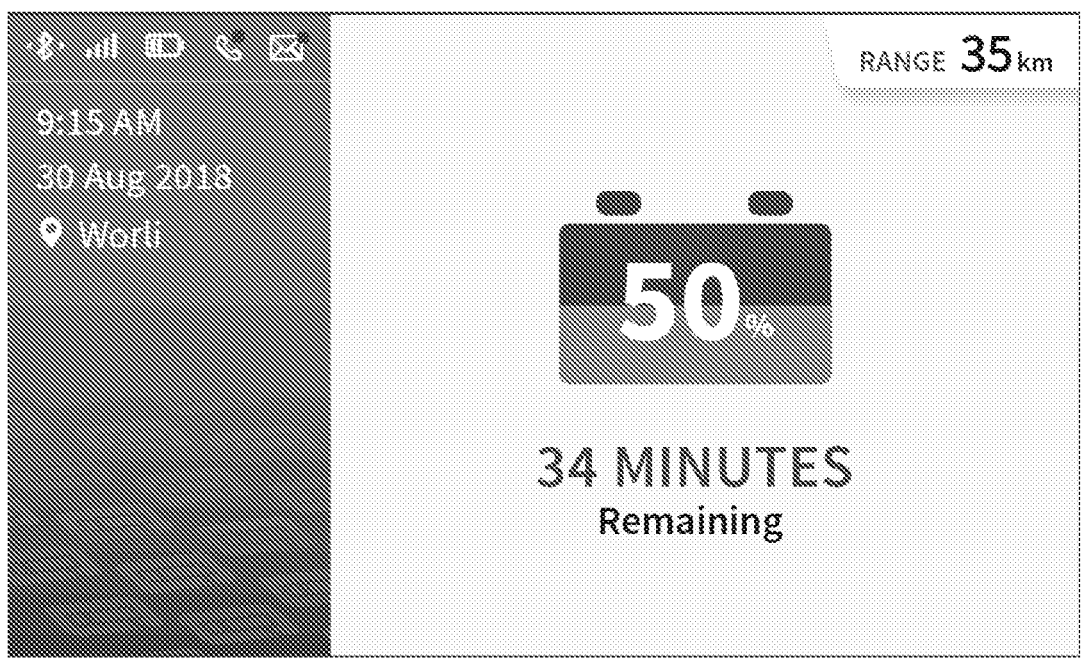
Figure 5J:
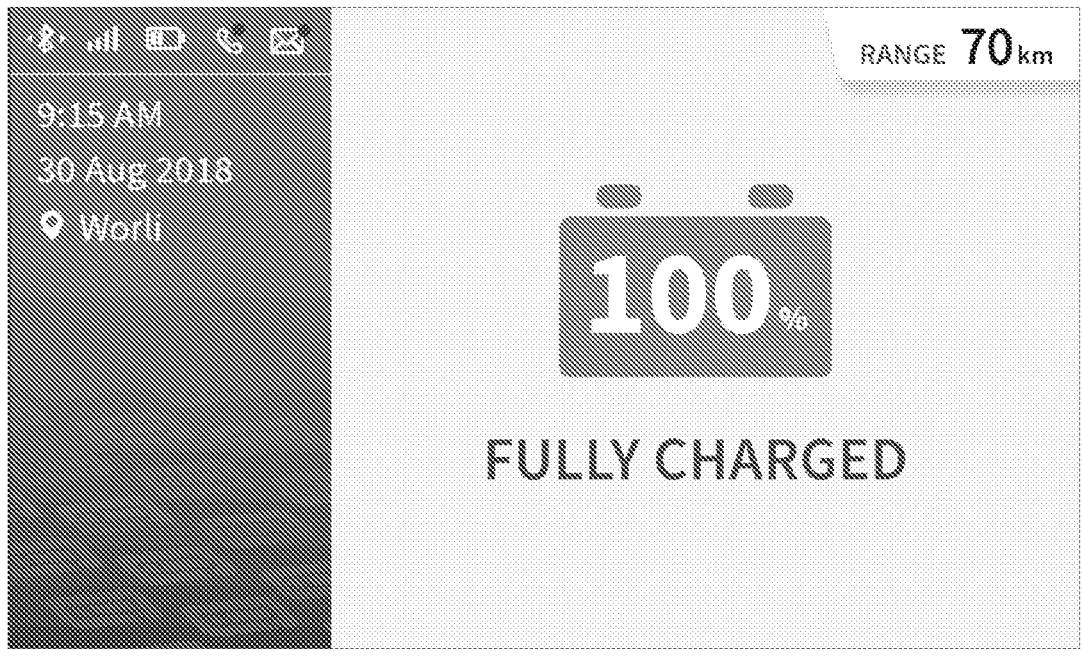
Figure 5K:
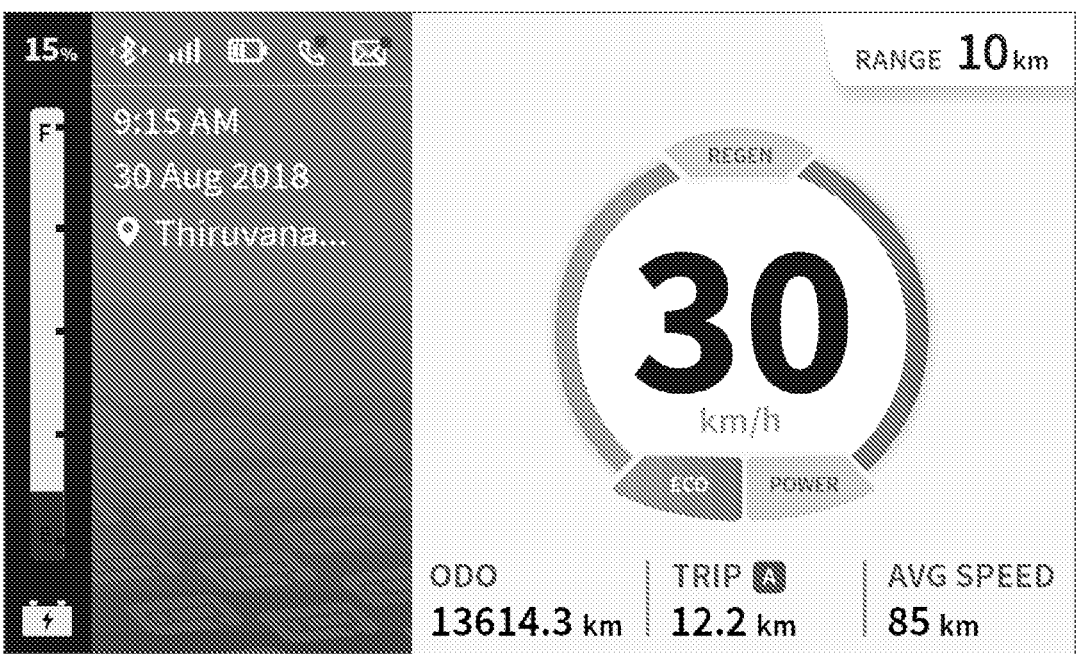
Figure 5L:
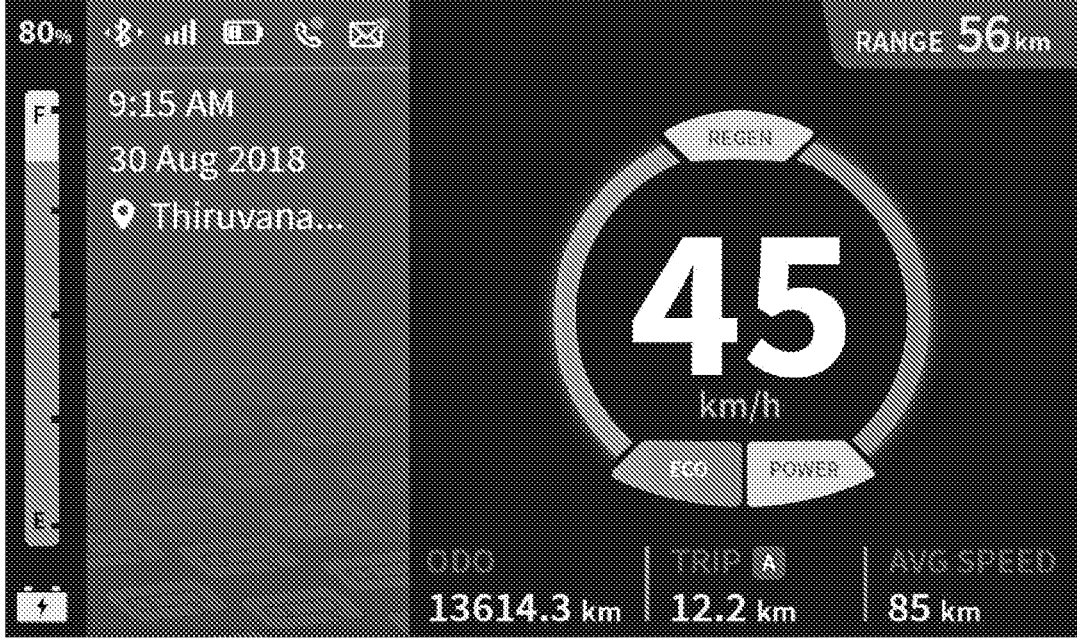

FIG. 5e exemplarily illustrates the graphical user interface of the display device 105 showing turn by turn navigation assistance and the estimated time of arrival at the destination to the user of the vehicle 108. FIG. 5f exemplarily illustrates the graphical user interface of the display device 105 showing the status of regenerative braking in the vehicle 108. FIG. 5g exemplarily illustrates the graphical user interface of the display device 105 showing the drive modes, for example, the power mode or the economy mode of the vehicle 108. Based on the drive mode, with remaining charge of the battery, the range of the vehicle or distance to empty of the vehicle 108 is displayed on the graphical user interface of the display device 105. FIG. 5h exemplarily illustrates the graphical user interface of the display device 105 showing enablement of park-assist mode in the vehicle 108 allowing the user to select between forward direction as well as reverse direction. FIG. 5i exemplarily illustrates the graphical user interface of the display device 105 showing status of charging of the battery and the time remaining to fully charge. The display device 105 also shows the range that the vehicle 108 can cover with the available charge of the battery. FIG. 5j exemplarily illustrates the graphical user interface of the display device 105 showing the fully charged condition of the battery and the range which can be covered by the vehicle 108 in the fully charged condition. FIG. 5k exemplarily illustrates the graphical user interface of the display device 105 which alerts the user about less charge remaining in the battery. The speed of the vehicle 108 and the range that the vehicle 108 can cover with the present battery situation are also displayed. FIG. 5l exemplarily illustrates the graphical user interface of the display device 105 in night mode to display all the features as that of the day mode with reduced brightness of the display unit of the display device to reduce eye strain to the user of the vehicle 108 for clear visibility of the rendered graphical user interface.

Figure 6A:
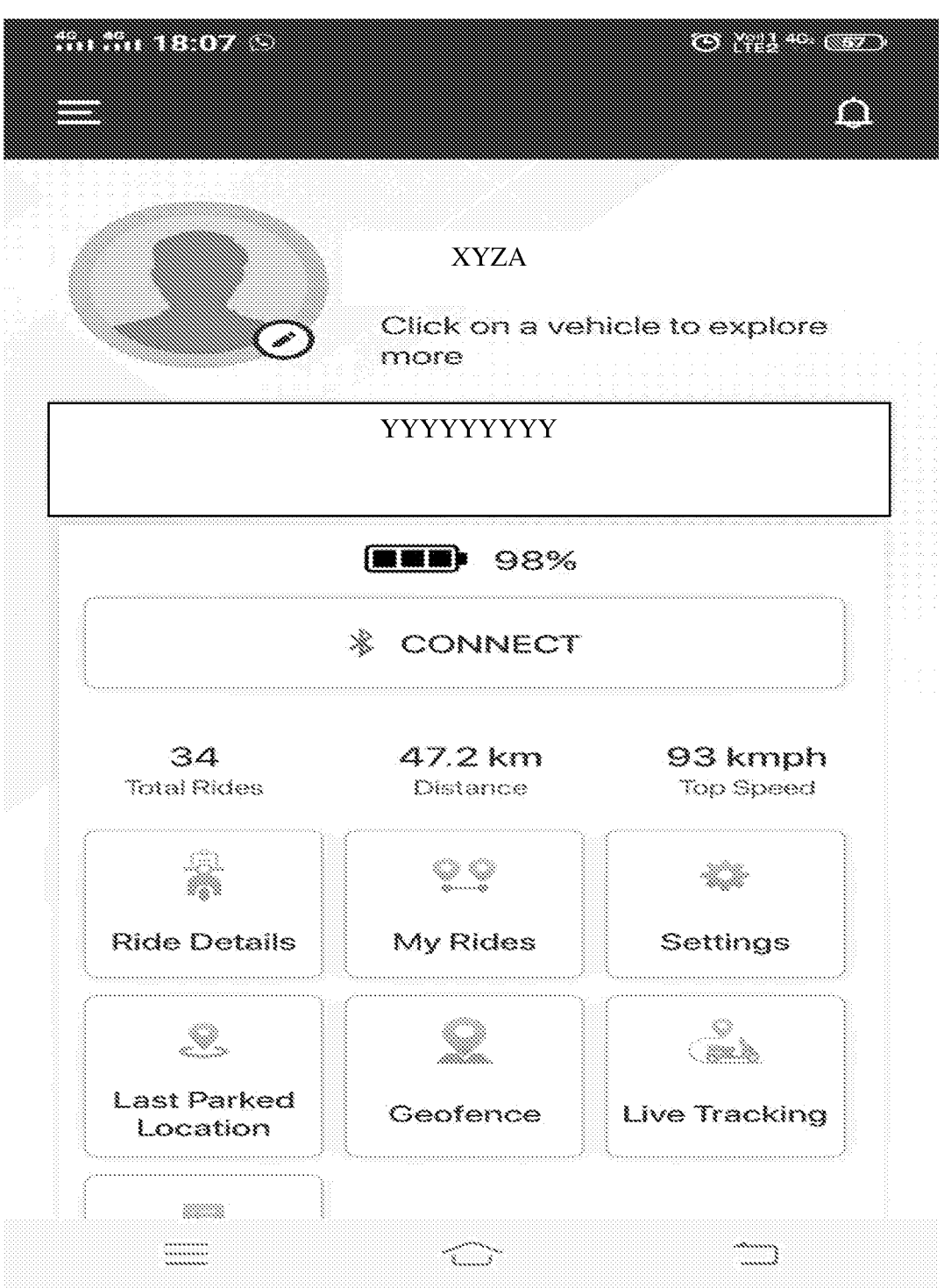
FIGS. 6a-6c exemplarily illustrates the user interface of the smart device.
Figure 6B:
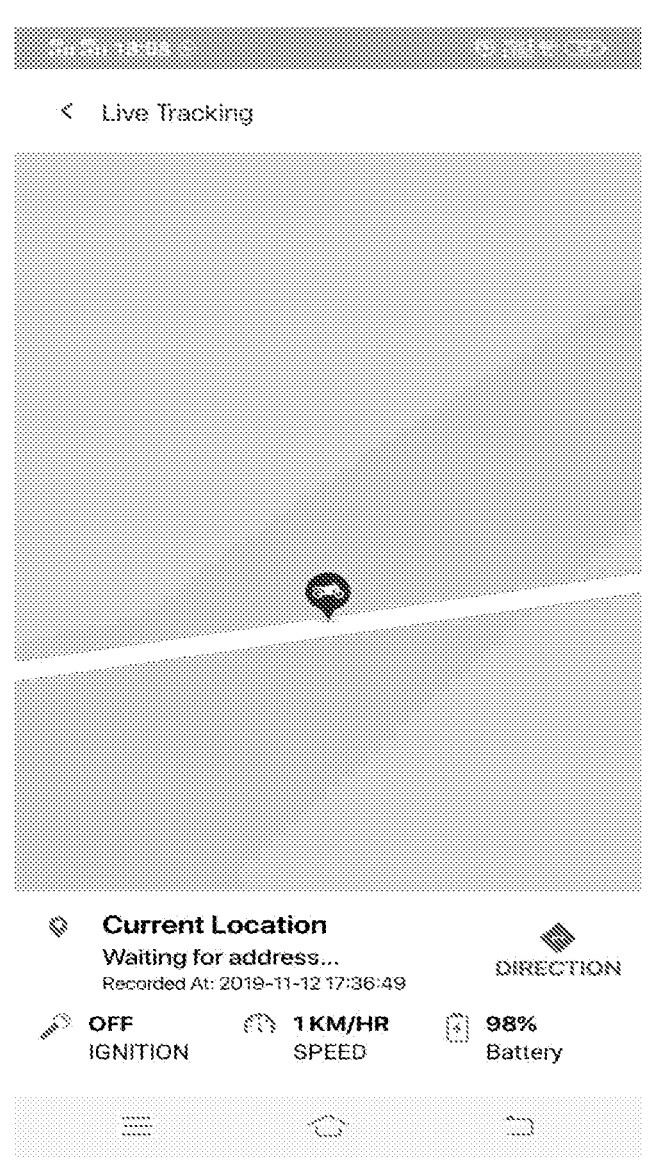
Figure 6C:
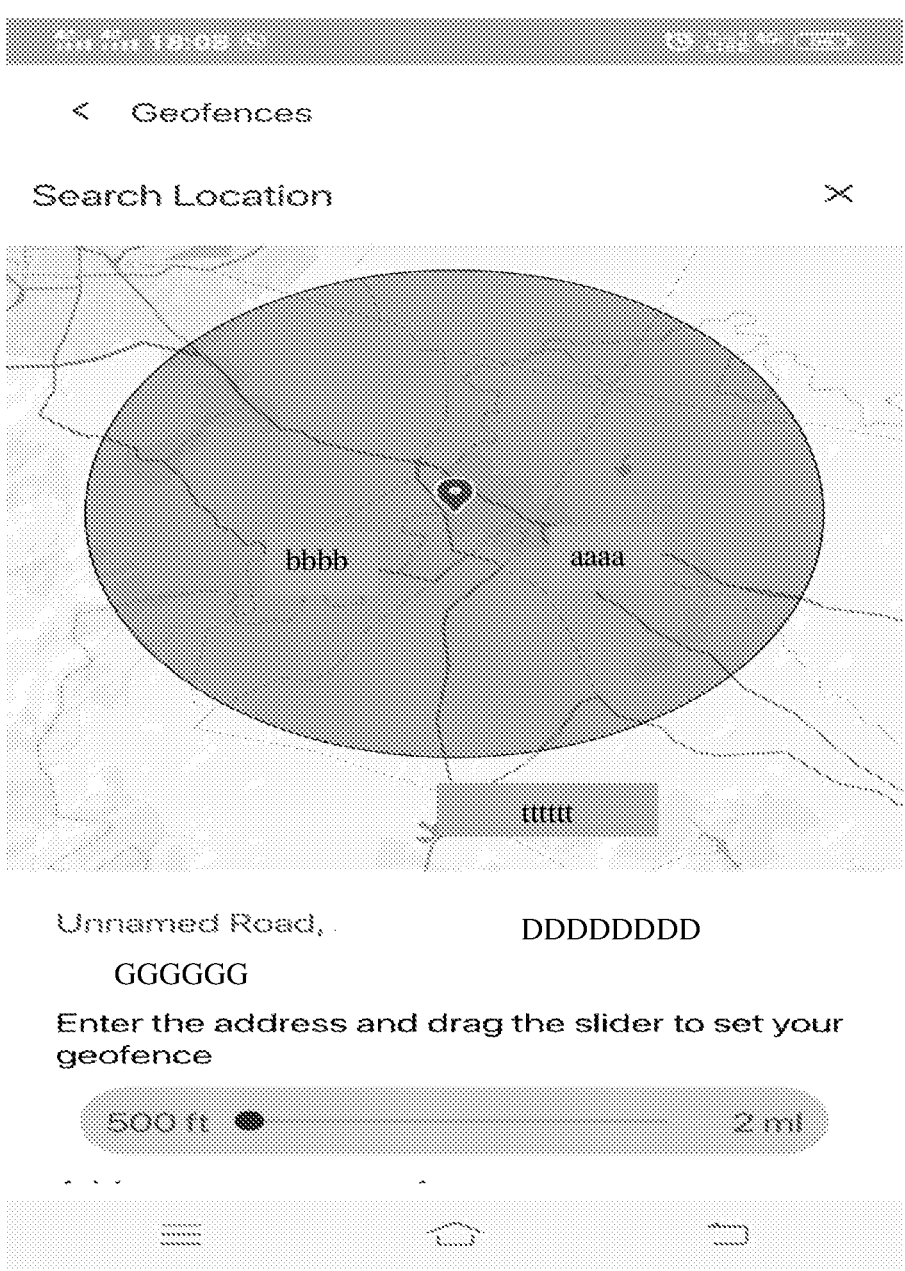

FIGS. 6a-6c exemplarily illustrates the user interface of the smart device 107. In an embodiment, the smart device 107 may be in possession of the user of the vehicle 108 in navigation. In an embodiment, the smart device 107 is in possession of the remote user of the vehicle 108, such as, the user of the vehicle 108 that is parked in a parking lot. As exemplarily illustrated, the user interface displays configuration of the geo-fence of the vehicle, a list of geo-fences configured, live location of the vehicle 108, and the user profile details retrieved from the user database in the server 106.

In an embodiment, when the vehicle 108 is in idle/lock screen condition the display device 105 of the vehicle 108 shows the welcome page to the user. In an embodiment, the cluster is interfaced with a navigation switch to navigate the screen on the on-board dashboard of the display device 105. This navigation switch will help the user to navigate the screens left, right, top, bottom and select option. This switch will be communicated to cluster through wired connection, but not limited to Controller Area Network (CAN). Many other improvements and modifications may be incorporated herein without deviating from the scope of the invention.

LIST OF REFERENCE NUMERALS

100: Driver assistance system
101: Battery and Battery Management System (BMS) of 108
102: Motor Controller Unit (MCU) of 108
103: Vehicle Control Unit (VCU) of 108
104: Telematics unit of 108
105: TFT cluster (smart display device) of 108
106: Server of 100
106(a): Processor of 106
106(b): Memory of 106
106(c): Networking device of 106
107: Smart device of 100
108: Vehicle
109: First network between 104 and 106
110: Second network between 106 and 107
111: Third network between 107 and 105
201: Motor/vehicle Control unit of 108

We claim:

1. A driver assistance system for assisting a driver of a vehicle, comprising:
   a plurality of sensors that send vehicle level data to the vehicle;
   a server; and
   a smart device, wherein
   the vehicle, the server, and the smart device communicate with each other via one or more communication networks,
   the server receives environmental related data and driver-related data from the smart device and receives the vehicle level data from the vehicle,
   the server processes the vehicle level data, the environmental data, and the driver-related data based on current and historical driving pattern of the driver, and provides inputs to the driver for different parameters including a real time charging status of the vehicle, health of a battery of the vehicle, and driving suggestions to enhance an operation range of the vehicle and causes a dynamic route to be displayed on the smart device and a display device of the vehicle,
   the smart device enables geo-fencing to prevent movement of the vehicle outside a geo-fenced region, and
   the server:
      determines a current location of the vehicle,
      upon determining that the vehicle is located outside the geo-fenced region, provides an alert to the smart device and immobilizes the vehicle,
      warns the driver through the display device about charge status of the battery, and
      immobilizes the vehicle upon determining that the vehicle cannot reach a destination with a remaining amount of charge of the battery based on availability of charging points en route to the destination.
2. The driver assistance system as claimed in claim 1, wherein the vehicle comprises a telematics unit to communicate the vehicle level data to surroundings of the vehicle, and the display device displays the vehicle level data received from the plurality of sensors for assistance of the driver.

3. The driver assistance system as claimed in claim 1, wherein the display device is configured with a Thin Film Transistor cluster.

4. The driver assistance system as claimed in claim 2, wherein the server communicates with the telematics unit over a first network;

the smart device communicates with the server on a second network; and the smart device communicates with the display device on a third network.

5. The driver assistance system as claimed in claim 1, wherein the vehicle comprises:

a battery management system;

a vehicle control unit; and a motor control unit, wherein the battery management system, the vehicle control unit, and the motor control unit are connected bi-directionally with each other and communicates the vehicle level data to a telematics unit.

6. The driver assistance system as claimed in claim 2, wherein the server comprises:

a processor that processes environmental related data and driver-related data received from the smart device and processes the vehicle level data received from the telematics unit;

a memory; and a networking device that communicates with the telematics unit of the vehicle and the smart device connected to the vehicle.

7. A method of assisting a driver for operation of a vehicle, the method comprising:

determining, by a control unit, a vehicle level data of the vehicle;

transmitting the vehicle level data to a server, by a telematics unit, such that the server process the vehicle level data;

acquiring and processing, by the server, environmental related data and driver-related data from a smart device, wherein the driver-related data includes contacts on the smart device, battery level of the smart device, and signal strength of the smart device;

communicating, by the server, the processed vehicle level data, the processed environmental related data, and the processed driver-related data to the smart device;

transmitting the processed vehicle level data, the processed environmental related data, and the processed driver-related data via the smart device to a display device;

enabling geo-fencing, by the smart device, to prevent movement of the vehicle outside a geo-fenced region;

determining, by the server, a current location of the vehicle;

upon determining that the vehicle is located outside the geo-fenced region, by the server, providing an alert to the smart device and immobilizing the vehicle;

warning the driver through the display device about charge status of a battery of the vehicle; and immobilizing the vehicle upon determining that the vehicle cannot reach a destination with a remaining amount of charge of the battery based on availability of charging points en route to the destination.

8. The method as claimed in claim 7, wherein the vehicle level data includes one or more of a state of charge, a battery state of health, and cell temperature.

9. The method as claimed in claim 7, wherein the vehicle level data is transmitted to the server by the telematics unit over a first network.

10. The method as claimed in claim 7, wherein the environmental related data includes at least one of destinations of a trip, trip distance, average speed, a driving mode of the vehicle, ride details, current status of charge of a battery, a last parked location, geo fencing, and live tracking of the vehicle.

11. The method as claimed in claim 9, wherein the processed vehicle level data, the processed environmental related data, and the processed driver-related data are communicated to the smart device by the server over a second network, and the environmental related data and the driver-related data are acquired from the smart device by the server over the second network.

12. The method as claimed in claim 11, wherein the processed vehicle level data, the processed environmental related data, and the processed driver-related data are transmitted to the display device by the smart device over a third network.

13. The method as claimed in claim 12, further comprising:

logging in to an interface on the smart device by the driver;

authenticating an identity of the driver of the vehicle by the server;

fetching a ride history of the driver from the server by the interface of the smart device;

querying a database in the server, wherein a user database includes at least one of historical drive patterns of the driver, a drive mode used by the driver, an estimated range of the vehicle used by the driver, and a charging pattern of the vehicle used by the driver; and transmitting processed information to the display device.

* * * * *